Aug. 5, 1947.     A. F. O'CONNOR     2,425,044
POWER TAKE-OFF
Filed April 5, 1945
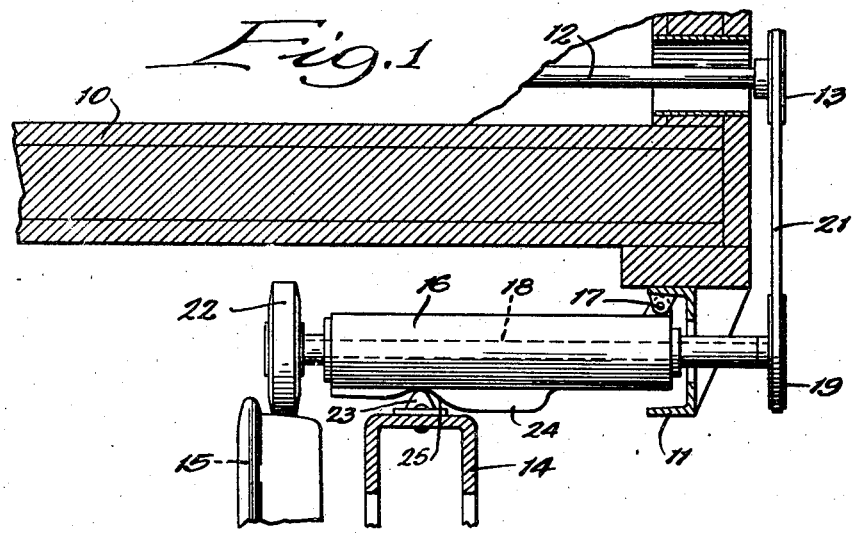
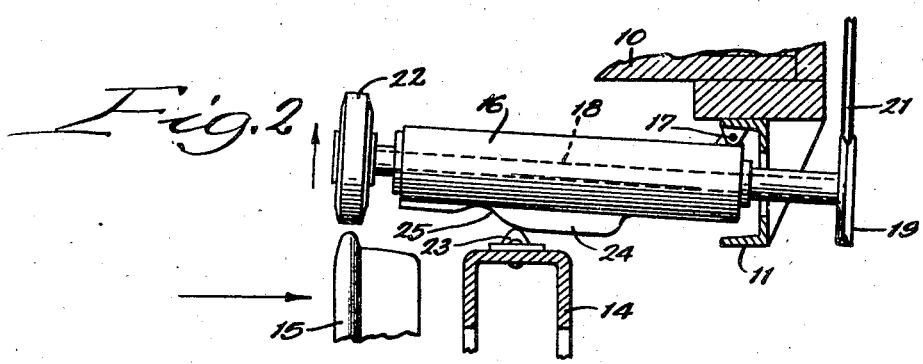
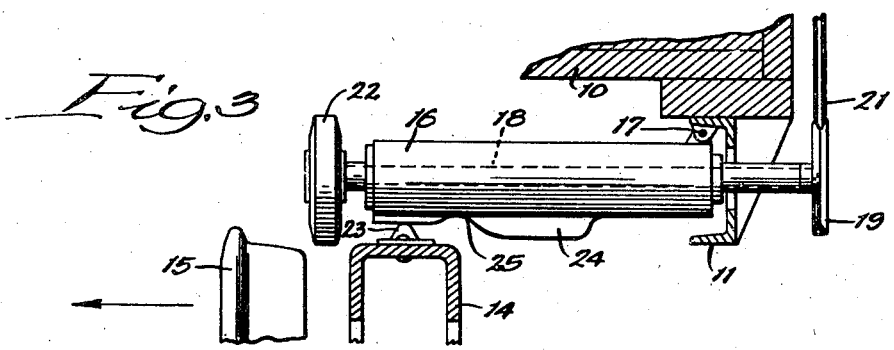
Inventor:
Arthur F. O'Connor,
By Davern, Cous and Booth,
Attorneys Patented Aug. 5, 1947

2,425,044

UNITED STATES PATENT OFFICE 2,425,044

POWER TAKE-OFF

Arthur F. O'Connor, Chicago, Ill., assignor to Union Asbestos & Rubber Company, a corporation of Illinois Application April 5, 1945, Serial No. 586,741

5 Claims. (Cl. 105—112)

1

This invention relates to power take-offs and more particularly to a mechanism for use with a railway car to drive an auxiliary device from the wheel of the car.

A take-off roller carried by the car body to engage the wheel must be movable vertically relative to the car body in order to follow springing movements of the body on the trucks. The roller is generally in fixed relation with the car body, laterally thereof. Inasmuch as the roller is generally provided with spring means for urging it in a direction toward the wheel, the roller tends to drop off and below the tread of the wheel, when the wheel moves laterally of the car under turning conditions.

Prior structures have been proposed in which the roller was permitted to drop below the tread of the car wheel when the car was on curved track and the roller was provided with extensions or portions adapted to ride upon the periphery of the wheel, to limit the drop of the roller tread with relation to the wheel tread; these extensions being adapted to place the roller in position to climb back upon the wheel tread after the car left curved track. The efficiency of such means for enabling the roller to climb back on the wheel tread depends upon such precise adjustment of the several parts of the take-off mechanism, precise contour and condition of wear of the roller tread and precise contour of the car wheel tread, as to be adversely affected by wear in the wheel tread, wear in the roller tread or by a very slight accidental misadjustment in any one of the several parts of the mechanism.

One of the important objects of the present invention is to provide new and novel means for automatically placing the roller in a safe, protected position when the car wheel moves out of driving range therewith and means for replacing the roller in tractive engagement with the wheel when the latter returns to driving alinement with the roller. According to one important feature of the invention, this function is performed independently entirely of the car wheel.

Another object is to be provide a power take-off in which the roller supporting mechanism is held in an elevated position when the roller is out of register with the wheel.

A specific object is to provide a power take-off in which the roller is carried by a support pivoted on the car body and the support is held elevated by cam means on the support and the truck when the truck and the car body are at an angle to each other.

The above and other objects and advantages will be more readily apparent from the following description when read in connection with the accompanying drawing in which—

Figure 1 is a partial transverse section with

2 parts in elevation through a power take-off embodying the invention; and

Figures 2 and 3 are views similar to Figure 1 showing different positions of the parts.

In the drawings, the car body is indicated generally at 10 and may be of any desired standard construction supported on longitudinal side beams 11. An auxiliary drive shaft 12 extends transversely of the car body and carries at one end adjacent the side of the car a drive pulley 13. The shaft 12 may be used to drive any desired auxiliary mechanism such as a circulating fan, a compressor, a generator or the like.

The car body is supported in the usual manner on a truck, a portion of whose frame is indicated at 14 and which carries a plurality of rail engaging wheels, one of which is shown at 15. The wheels may be of the conventional flanged construction having tapering rail engaging surfaces with outwardly extending flanges at their inner sides. When the car is operating on substantially straight track so that the truck and car body are substantially alined, the parts will occupy the position shown in Figure 1 but as the car turns in one direction or the other the truck and wheel will move relatively toward its outer edge as shown in Figure 2 or toward its center as shown in Figure 3.

The take-off mechanism of the present invention comprises an elongated tubular support 16 pivoted to the car body at 17 adjacent one end of the support and close to the outer edge of the car. A shaft 18 extends rotatably through the support 16 and carries at its outer end a drive pulley 19. The pulleys 13 and 19 may be connected by a belt 21 which may be sufficiently resilient to accommodate pivotal movements of the support or which may be tensioned by an idler pulley or the like, not shown, to permit a slight separation of the pulleys 13 and 19. It will be noted that the pulley 19 is relatively close to the pivot 17 so that separation of the pulleys 13 and 19 caused by the pivotal movement of the support 16 required to accommodate conditions encountered in normal use will be relatively small.

At its opposite end the shaft 18 carries a drive roller 22 which may be faced with rubber or like friction material to engage the rolling surface of the wheel 15. The parts are so constructed that when the truck and car body are in alinement, as shown in Figure 1, the roller 22 will engage the rolling surface of the wheel 15 to be driven thereby and to drive the shaft 12 through the pulleys 19 and 13 and the belt 21.

When the car is operating on curved track so that the wheel tends to move laterally of the car body the roller 22 will be moved out of register with the wheel. To prevent the roller from dropping down under these conditions so that it could not properly reengage the wheel when the truck and car body move back into alinement, cooperating cam means are provided on the truck and support to hold the roller elevated. As shown, the cam means comprise a cam projection 23 carried by the upper surface of the truck frame 14 and a cam plate 24 projecting downwardly from the support 16. The cam plate 24 is formed with a central notch 25 which registers with the cam projection 23 when the truck and car body are alined, as shown in Figure 1. Preferably, the cam plate 24 is deeper adjacent the outer edge of the car than toward the car center so that the roller 22 will be elevated to a greater extent when the car wheel and truck move outwardly than when they move toward the car center.

Under normal operating conditions with the parts in the position shown in Figure 1, the support is free to move about its pivot 17 so that the roller 22 can follow vertical movements of the wheel relative to the car body to maintain driving contact with the wheel. When the car turns in a direction to move the wheel and truck frame toward the outer edge of the car body, as shown in Figure 2, the cam projection 23 will engage the outer side of the cam plate 24 to elevate the roller 22 over the flange on the car wheel. When the truck and the car body are again turned back into alinement, the roller can drop properly into engagement with the wheel to reestablish the driving conditions of Figure 1. Similarly, when the wheel and truck move toward the center of the car, as shown in Figure 3, the inner portion of the cam plate 24 will engage the cam projection 23 to hold the roller in an elevated position substantially in alinement with the outer edge of the wheel. Therefore, as the truck and car body turn back into alinement, the roller can move over the outer edge of the wheel to the driving position shown in Figure 1.

It is to be understood that my take-off mechanism may be provided with any suitable type of spring means and may also be provided with suitable guide means on the car body to limit the movement of the roller substantially vertically. While I have shown the outer end of the support 16 pivoted to the side beam, it will be evident that other methods of movably mounting the support may be used, such as rubber mounting, ball and socket, etc. The clearance between the projection 23 and the cooperating portions of the support 16 may be sufficient to accommodate the vertical springing movement of the car on the trucks and lateral movements of the truck side frame (on straight track) to prevent moving the roller out of tractive engagement with the car wheel. I contemplate the use of a roller mounted upon the side frame, as an alternate to the fixed projection 23, as a means of reducing friction and wear.

While one embodiment of the invention has been shown and described in detail herein, it will be understood that this is illustrative only and is not intended as definition of the scope of the invention, reference being had for this purpose to the appended claims.

What is claimed is:

1. A power take-off for a railway car having a car body supported on a truck carrying a rail engaging wheel comprising a support pivoted on the car body, a shaft rotatably carried by the support, power take-off means connected to the shaft, a roller on one end of the shaft to engage the upper part of the rail engaging wheel when the truck and car body are substantially alined, and cooperating means on the support and the truck to hold the support elevated about its pivot when the truck and the car body are at an angle to each other.

2. A power take-off for a railway car having a car body supported on a truck carrying a rail engaging wheel comprising a support pivoted on the car body, a shaft rotatably carried by the support, power take-off means connected to the shaft, a roller on one end of the shaft to engage the upper part of the rail engaging wheel when the truck and car body are substantially aligned, and a cam couple on the support and the truck to elevate the support about its pivot when the truck and car body are at an angle to each other, one member of the couple comprising a relatively narrow cam projection and the other member of the couple comprising an elongated cam plate extending transversely of the car and having a central cam notch which registers with the projection when the car and truck are alined.

3. A power take-off for a railway car having a car body supported on a truck carrying a rail engaging wheel comprising a support pivoted on the car body, a shaft rotatably carried by the support, power take-off means connected to the shaft, a roller on one end of the shaft to engage the upper part of the rail engaging wheel when the truck and car body are substantially alined, an upwardly extending cam projection on the truck, and a cam plate on the support having a central cam notch which registers with the projection when the car and truck are alined.

4. A power take-off for a railway car having a car body supported on a truck carrying a rail engaging wheel and having a shaft in the car body carrying a drive pulley comprising an elongated support pivoted adjacent one end on the car body, a shaft extending rotatably through the support, a pulley carried by the shaft adjacent the end of the support at which it is pivoted, a belt drivably connecting the pulleys and adapted to yield as the support moves about its pivot, a drive roller carried by the other end of the shaft and adapted to engage the upper part of the rail engaging wheel when the truck and car body are substantially alined, and cooperating cam means on the truck and the support to elevate the support about its pivot when the truck and the car body are at an angle to each other.

5. A power take-off for a railway car having a car body supported on a truck carrying a rail engaging wheel and having a shaft in the car body carrying a drive pulley comprising an elongated support pivoted adjacent one end on the car body, a shaft extending rotatably through the support, a pulley carried by the shaft adjacent the end of the support at which it is pivoted, a belt drivably connecting the pulleys and adapted to yield as the support moves about its pivot, a drive roller carried by the other end of the shaft and adapted to engage the upper part of the rail engaging wheel when the truck and car body are substantially alined, an upwardly extending cam projection on the truck, and an elongated cam plate on the support having a central cam notch which registers with the projection when the car body and truck are alined.

ARTHUR F. O'CONNOR.